(12) United States Patent
Whittenberger et al.

(10) Patent No.: US 9,457,336 B2
(45) Date of Patent: Oct. 4, 2016

(54) SEALS FOR USE WITH FOIL SUPPORTED AND CATALYST STRUCTURES

(71) Applicant: Johnson Matthey Public Limited Company, London (GB)

(72) Inventors: William A. Whittenberger, Leavittsburg, OH (US); Todd A. Romesberg, Vienna, OH (US); Louis J. Zuponcic, Garrettsville, OH (US); Lorne W. DeYoung, Southington, OH (US); Gordon W. Brunson, Chagrin Falls, OH (US)

(73) Assignee: JOHNSON MATTHEY PLC, London (GB)

( * ) Notice: Subject to any disclaimer, the term of this patent is extended or adjusted under 35 U.S.C. 154(b) by 0 days.

(21) Appl. No.: 14/608,480

(22) Filed: Jan. 29, 2015

(65) Prior Publication Data

US 2015/0209755 A1    Jul. 30, 2015

Related U.S. Application Data

(60) Provisional application No. 61/932,980, filed on Jan. 29, 2014.

(51) Int. Cl.
| | | |
|---|---|---|
| *B01J 19/24* | (2006.01) | |
| *B01J 19/00* | (2006.01) | |
| *B01J 8/06* | (2006.01) | |
| *B01J 19/30* | (2006.01) | |

(52) U.S. Cl.
CPC .............. *B01J 19/2485* (2013.01); *B01J 8/067* (2013.01); *B01J 19/0073* (2013.01); *B01J 19/2495* (2013.01); *B01J 19/305* (2013.01); *B01J 2208/00814* (2013.01); *B01J 2219/2443* (2013.01); *B01J 2219/3085* (2013.01); *B01J 2219/30215* (2013.01); *B01J 2219/30475* (2013.01)

(58) Field of Classification Search
CPC .............. B01J 19/0073; B01J 19/2485; B01J 19/2495; B01J 19/32; B01J 19/325; B01J 2208/00814; B01J 2219/2443; B01J 2219/3085

See application file for complete search history.

(56) References Cited

U.S. PATENT DOCUMENTS

| | | | |
|---|---|---|---|
| 5,585,046 A | * | 12/1996 | Jansen ................... B01D 3/141 261/97 |
| 7,682,580 B2 | | 3/2010 | Whittenberger et al. |
| 8,863,385 B2 | | 10/2014 | Whittenberger et al. |
| 2004/0120871 A1 | * | 6/2004 | De Angelis ............ B01J 8/0214 422/222 |
| 2013/0259757 A1 | | 10/2013 | Whittenberger et al. |
| 2013/0259767 A1 | | 10/2013 | Whittenberger et al. |
| 2014/0205506 A1 | | 7/2014 | Whittenberger et al. |

* cited by examiner

*Primary Examiner* — Lessanework Seifu
(74) *Attorney, Agent, or Firm* — Pearne & Gordon LLP

(57) ABSTRACT

Described herein are flexible seals for directing fluid flow in a tubular reactor, such as a reformer, for enhancing heat transfer and reactor efficiency. The seals can be made of corrugated metal foil that is expandable in the radial direction for accommodating the expansion and contraction of reactor components in the tubular reactor during operation. The seals can block or redirect fluid flow through the reactor. Fluid is directed to the interior of the reactor by the seals and bypass around the outer circumference of the reactor components is reduced or eliminated.

10 Claims, 5 Drawing Sheets

SEALS FOR USE WITH FOIL SUPPORTED AND CATALYST STRUCTURES

This application claims the benefit of U.S. Provisional Application No. 61/932,980 filed Jan. 29, 2014, which is incorporated herein by reference in its entirety.

FIELD OF THE INVENTION

The present invention relates to improved seals for use with reactor components, including foil supported and structured catalysts used in reactor tubes, and in particular, improved seals for increasing heat transfer and reactor efficiency by directing fluid flow through reactor components.

BACKGROUND

Reactor components for carrying out catalytic reactions, such as those used to produce syngas or hydrogen, can generally contact reactor tubes exposed to a heat source, for example a combusting gas, to support reactions. In contrast, other types of reactions, such as exothermic reactions, can require a cooling source, such as a cooling jacket. The reactor tubes can be loaded with various arrangements of reactor components, such as foil-supported or structured catalysts in the form of fans, fins, coils, foams, or monoliths. In some instances, the reactor components can be expandable, such as those formed from foil, for example, a fan. Expandable catalyst-coated reactor components can be positioned to increase heat transfer, such as being in contact with or in a controlled proximity to the reactor wall exposed to a heating or cooling source.

To improve heat transfer and fluid flow through a reactor tube, the use of seals fitted to or configured with foil-supported and structured catalysts can be used. Fluid flow through the reactor can be directed, or even blocked, to enhance heat transfer from the reactor wall and ensure the fluid transfers that energy to the entire surface area of the reactor components, such as near the center of the reactor. Thus, it is desirable to fit reactors with seals that promote increased heat transfer and reactor efficiency.

Various embodiments of seal components and arrangements for improving performance of reactors are discussed herein. The seals shown and described herein preferably are manufactured at low cost, are flexible to conform with irregular reactor tube surfaces or dimensional changes during operation such as expanding and contracting reactor components, suitable for use in high temperature environments, easily installed and generally inflatable such that backpressure can be created to enhance contact of the seal with the reactor tube wall while allowing the seal to accommodate reactor tube dimensional creep over its lifetime.

BRIEF SUMMARY

Described herein are various embodiments of seals for use with reactor components arranged in a reactor tube.

In one embodiment, a reactor includes a reactor tube with an inner wall surface and an outer wall surface. One or more reactor components are arranged in the reactor tube. A reactor component typically has an outer circumferential face, a top surface and a bottom surface. The circumferential face of the reactor component faces the inner wall surface of the reactor tube such that a gap is present between the outer circumferential face of the reactor component and the inner wall of the reactor tube. A flexible seal, such as a corrugated seal, is arranged in the reactor tube and the seal is in direct contact with the inner wall surface of the reactor tube and the outer circumferential face, the top surface or the bottom surface of the reactor component. A portion of the flexible seal is positioned to substantially block fluid flow through the reactor between the outer circumferential face of the reactor component and the inner wall of the reactor tube.

The flexible seal can be corrugated and made of metal, such as metal foil. The seal is expandable in the radial direction such that is pushes outward and remains in contact with the inner wall surface of the reactor tube during operation and expansion and contraction of reactor components. The flexible seals also can be in direct contact with the reactor components that can have changing structural dimensions during operation. To maintain contact with the reactor components, and prevent sliding or movement, the seals can be attached to the reactor components, for example by welding, or otherwise can be arranged such that the seals are held in contact with the reactor components by force, such as compressing the seals between the reactor components and the reactor tube.

An example flexible seal has a portion thereof in contact with the top surface of a reactor component. The seal also can be in contact with the circumferential face, bottom surface or a combination of both.

In another embodiment, the flexible seal is arranged in the reactor tube such that the seal is positioned between two reactor components. The seal is arranged to contact the top and bottom surface of an adjacent reactor component and thereby the seal functions to separate the two reactor components so that the two components are not in contact with one another.

The seal can be configured to include a portion thereof arranged between the outer circumferential face of the reactor component and the inner wall of the reactor tube such that the outer circumferential face and inner wall surface are not in contact with one another during operation.

In another aspect, a portion of the seal is in contact with the outer circumferential face of the reactor component. A remaining portion of the seal extends outward, e.g., at an angle, from the outer circumferential face of the reactor component towards the inner wall surface of the reactor tube. The portion extending outward from the outer circumferential face of the reactor component can have an angle of 30 to 70 degrees with the outer circumferential face. In another example, the portion extending outward from the outer circumferential face of the reactor component can have an angle of 100 to 150 degrees with the outer circumferential face.

In yet another embodiment, a portion of the seal is in the shape of a ring that can be in contact with the outer circumferential face of the reactor component. A separate portion of the seal can extend outward at an angle towards the inner wall surface of the reactor tube for redirecting and blocking fluid flow through the gap between the reactor component and reactor tube.

BRIEF DESCRIPTION OF THE DRAWINGS

The following figures illustrate various aspects of one or more embodiments of the present invention, but are not intended to limit the present invention to the embodiments shown.

DETAILED DESCRIPTION

As used herein, when a range such as 5-25 is given, this means at least or more than 5 and, separately and independently less than or not more than 25. Materials of construction for all reactor components or parts thereof, such as cones, expansion weights, catalyst supports, center supports and inner and reactor tubes, as discussed herein, can include any suitable material as known in the art, for example, metal, non-ferrous metal, metal foil, steel, stainless steel, alloys, foils, non-metals such as plastics or glass, ceramic, or combinations thereof.

The reactors as described herein, sometimes referred to as a stackable structural reactors ("SSR"), can include reactor components, e.g., one or more catalyst support components, arranged around or stacked on a center support, such as a central rod or mandrel, pipe, inner tube, post or the like, such that the catalyst support components are of general annular cross section as viewed in the direction of flow of fluid through the reactor. The reactor components can include, for example, catalyst support components such as perforated metal structures, spiral wound structures and folded metal structures on which or within which a catalyst material is applied or present. The perforated metal structures can include baskets, cups, foams or metal foams and the like. Spiral wound and folded metal structures can include metal foil leaves, wound cores, corrugated metal discs, monoliths or fans, for example, as shown in U.S. Pat. Nos. 8,721,973; 7,906,079 and 7,682,580. Alternatively, ceramic catalyst support structures may be used.

As arranged or positioned in the reactor tube, the catalyst support components can occupy all or a portion of the annular space in a reactor tube. Where the center support is a pipe or inner tube, the monolith or stacked catalyst supports can occupy all or a portion of the annular space between the exterior wall of the pipe or inner tube and the inner wall of the reactor tube. As described herein, various modifications and embodiments of the reactors and associated reactor components can be used in connection with various flexible seal arrangements to promote heat transfer and reactor efficiency. For instance, the reactor tube can be exposed to an exterior heating or cooling source that functions to transfer heat to or from the interior of the reactor tube for carrying out reactions. The reactor tube, or more than one reactor tube, may be, if desired, positioned in a reaction vessel that provides a heating or cooling source. In a preferred embodiment, the reaction vessel is a steam reformer in which the reactor tubes may be heated by a hot gas, and where the reactor components include a steam reforming catalyst.

Figure 1:
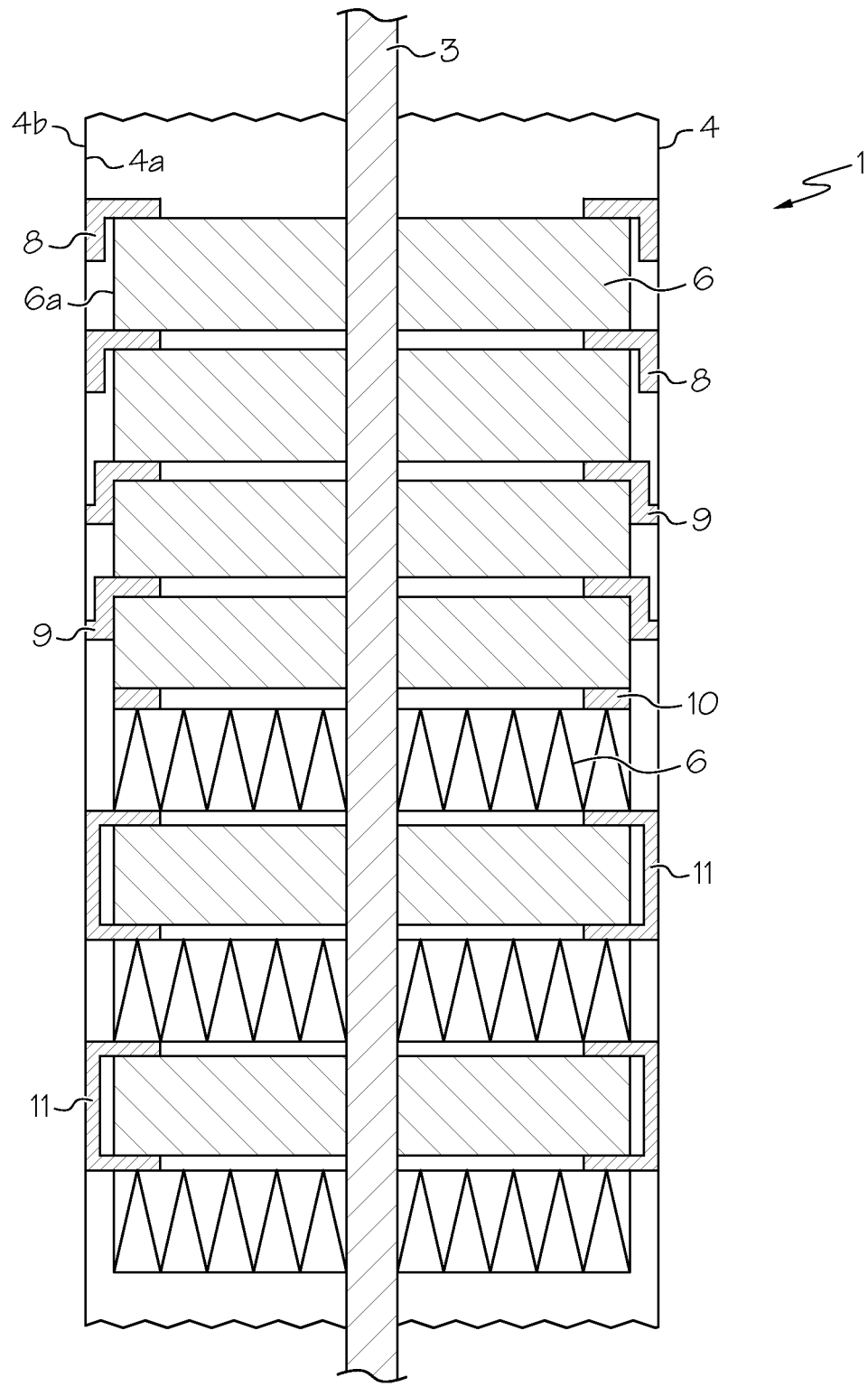
FIG. 1 shows a cross-section view of reactor components stacked in a reactor tube. The reactor components have various embodiments of seals positioned between the reactor components for reducing fluid flow bypass around the perimeter of the components.

Turning to the figures, FIG. 1, a reactor 1 can have a reactor tube 4 having an inner wall surface 4a and an outer wall surface 4b, such as a reformer tube, and house one or more reactor components 6, such as vertically stacked fans, foams, cores, for example spiral wound cores or foam cores, cups, such a perforated cups, baskets or monoliths, arranged around a center support 3. The diameter of the reactor tube 4 is preferably constant along its entire length. In the case of reformer tubes, portions of the tube 4 can have a larger diameter and create bulges or expanded portions in the reactor tube. As described above, reactor components 6 are constructed to have a central opening for receiving the center support 3 and center section components, such as an inner tube (not shown). The center support 3 can have a length to accommodate the length of the reactor tube 4. Optionally, the center support 3 can have a bracket, bushing, base plate or the like for providing a stop fitting so the reactor components, such as a fan or monolith 6, do not slide off of the center support 3. The base plate can be located at or near the bottom end of the center support 3 and can have a shape and diameter or dimensions to permit ease of install in the reactor tube 4.

The center support 3 can be preloaded with any number of reactor components or washers, for example 10 in FIG. 1, before being inserted into the reactor tube 4. The components 6 can be stacked vertically, one on top of another as shown, to form layers of reactor components, either vertically or in alternative ways such as horizontal to accommodate orientation of a reactor or certain technology requirements. Washers can be inserted between one or more reactor components (e.g., fans) as desired, for example, each fan can be separated by a washer wherein the washer creates an open space between the components 6. As also shown, a seal can be used to separate reactor components stacked along the center support to eliminate the need for separation washers. Stacked reactor components 6 can be arranged vertically as desired, for example, in the range of typically 0.2 to 1.5 meters, or alternatively up to 5 or 10 meters, to create a subassembly. Multiple subassemblies can be stacked together in a reactor, for example from 1 to 60 subassemblies can be stacked. The stacked subassemblies can have a height in the range of 1 to 20 meters.

As noted above, the reactor components 6 may comprise fans or monoliths, either used with or without seals and washers. In one embodiment, the reactor components 6 can be catalyst supports, such as fans, cores, coils, monoliths or foams having one or more catalyst coatings. Washers or seals used in connection with the components 6 can optionally have a catalyst coating to effectively distribute catalyst contact with the fluid flowing through the reactor. Catalyst coatings are known in the art and can include nickel, palladium, platinum, zirconium, rhodium, ruthenium, iridium, cobalt and oxides of aluminum, cerium, and zirconium.

The catalyst supports 6 and seals can be expandable in the radial direction such that the supports and seals can be pushed outward radially to the reactor tube 4. As arranged in the reactor tube 4, the reactor components 6 can occupy a portion or substantially the entire annular space in the reactor tube. The components 6, when expandable and in the collapsed state, have a diameter less than the inside wall of the reactor tube 4a. In the expanded position, the components 6 can be in direct contact with the reactor tube wall 4a or preferably create a small predetermined gap between the inner wall surface 4a of the reactor tube 4 and the outer diameter or circumferential face 6a of the components 6. The gap between the outer edge diameter face of the reactor components and the inner wall surface of the reactor tube can be at least 0.5, 1, 2, 3, 5, 10 or 15 mm, and preferably in the range of 0.5 to 6 mm, and more preferably 1 to 3 mm. In certain instances, for example with spiral wound monoliths having vertical flow paths, such a gap allows a portion of the fluid flow through the reactor to bypass the components around their outer diameter. Heat transfer can be reduced if the fluid bypassing the reactor components is not redirected to the interior portion of the reactor, which effectively transfers heat from the exterior of the reactor to the reactor components, or vice versa, and fluid contained therein for promoting catalytic reactions. To prevent fluid flow through the gaps around the outer circumferential face of the components, one or more seals can be used in conjunction with the reactor tube and reactor components.

FIG. 1 shows various seals arranged on reactor components to prevent fluid flow from bypassing the components stacked in the reactor tube. The seals are preferably made from corrugated metal foil. The corrugated seals are flexible and can expand in the radial direction for use in the reactor tube. For example, the seals, in an uncompressed state, can have an outer diameter greater than the inner diameter of the reactor tube. The seals can be compressed radially inward for installation in the reactor tube and, upon arrangement in the reactor tube, the seals push radially outward to press against the inner wall of the reactor tube to form a blockage along the inner wall of the reactor tube. The radial flexibility of the seals ensures constant contact with the reactor tube as reactor components expand and contract during operation. When corrugated, the corrugations of the seal pressed along the inner wall surface of the reactor tube can allow a small amount of fluid flow through the reactor along the reactor tube wall whereas the bulk of the fluid flow is substantially blocked and forced to flow towards the interior of the reactor tube around the center opening in the seals.

In one embodiment, a seal 8 can have an "L" ring shape with a center opening. As shown in FIG. 1, a portion of the seal 8 can overlap and be in direct contact with the outer diameter, top surface portion of a reactor component. The seal 8 further extends radially outward from the top edge of the reactor component to directly contact the inner wall surface 4a of the reactor tube 4. Alternatively, the seal 8 can be arranged in the vertical opposite direction such that a portion of the seal 8 can overlap and be in direct contact with the outer diameter, bottom surface portion of a reactor component instead of the top surface. The remaining portion of the seal 8 is oriented along the reactor tube wall and parallel to the outer circumferential face of the reactor component. As arranged in the reactor tube, the seal 8, being in contact with the reactor tube surrounding the reactor component, effectively blocks and, in turn, redirects fluid flow towards the interior portion of the reactor tube.

A void space can exist, as shown, between the outer circumferential face 6a of the reactor component and the portion of the seal 8 pressed up against and along the reactor tube. During operation the reactor component 6 can expand radially outward and be in contact with the portion of the seal 8 on the inner wall surface 4a. Alternatively, the reactor component 6 can be installed such that the outer circumferential face 6a is in direct contact with the portion of the seal on the inner wall surface of the reactor tube, for example as depicted for the seal 9.

Figure 2:
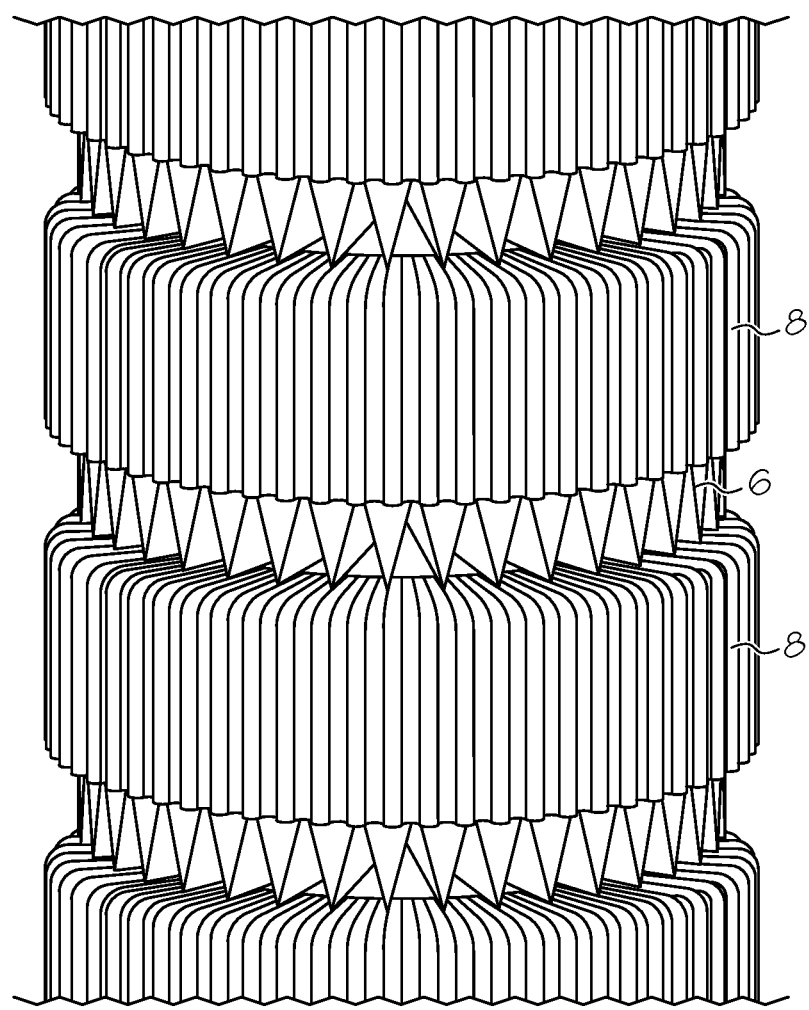
FIG. 2 shows a perspective view of various corrugated "L" seals positioned over stacked reactor components that can be inserted into a reactor tube.

FIG. 2 shows examples of "L" shaped seals 8 covering reactor core components that are stacked in an alternating manner with reactor fan components 6 for use in a reactor tube. The seals 8 have a portion that extends along the entire circumferential face of the core component. In operation, the portion of the seal 8 extending along the circumferential face would be in direct contact with the inner wall surface of the reactor tube and, optionally, with the face of the core component. The remaining portion of the seal 8 bends inward at about a 90-degree angle towards the center of the reactor component to form a radial opening. The reactor fan component 6 directly above the core component is in contact and rests on the seal 8 portion positioned between the two components such that the two components do not touch one another. The seal 8 forms an opening at its center to expose the reactor component positioned inside the seal so that fluid flow through the reactor can enter the covered component for purposes of carrying out catalytic reactions.

In another embodiment, a seal 9 can have a "Z" shape having three portions. As shown, the first portion can overlap and be in direct contact with the outer diameter, top surface portion of a reactor component 6. The seal 9 extends radially outward from the top edge of the reactor component and bends, e.g., at a 90-degree angle, to form a second portion. Alternatively, the seal 9 can be arranged such that the first portion of the seal 9 can overlap and be in direct contact with the outer diameter, bottom surface portion of a reactor component 6 instead of the top surface. The second portion of the seal 9 extends along and, optionally, can be in direct contact with the outer circumferential face of the reactor component facing the inner wall 4a of the reactor tube. The second portion can extend along the entire vertical length of the outer circumferential face or optionally a portion thereof, for instance, at least 10, 30 or 50 or 90 percent of the face.

The second portion extends along the outer circumferential face of the reactor component and bends, e.g., at a 90-degree angle, to form a third portion. The third portion of the seal 9 extends radially outward from the outer circumferential face of the reactor component to directly contact the inner wall surface 4a of the reactor tube 4. Being in direct contact with the inner wall surface of the reactor tube and the circumferential face of the reactor component 6, the third portion of the seal 9 forms a continuous gap between the circumferential face and reactor tube. The formed gap is not open in the direction of fluid flow and the second and third portions of the seal 9 effectively block fluid flow from bypassing the reactor component 6 along its outer circumferential face 6a.

The seals can be designed in a "U" shape. As shown in FIG. 1, the seal 11 can have two ends. Each end of the seal 11 is in direct contact with the top or bottom surface of the reactor component 6. The two ends extend radially outward from the top and bottom edges of the reactor component and bend, e.g., at a 90-degree angle, to form a middle portion. The middle portion of the seal 11 between the two ends extends along and, optionally, can be in direct contact with the outer circumferential face of the reactor component. As shown, the middle portion of the seal 11 presses against and is in direct contact with and extends along the length of the inner wall surface 4a of the reactor tube 4. As arranged in the reactor tube, the ends and middle portion of the seal 11 effectively block fluid flow from bypassing the reactor component 6 along its outer circumferential face 6a.

FIG. 1 shows that the seals 8, 9 and 11 have at least one portion that contacts the top or bottom surface of a reactor component. The portion of the seals 8, 9, 11 in contact with the top surface or the bottom surface of a reactor component, e.g., a first reactor component, also can be in contact with the top or bottom surface of an adjacent reactor component, for example, a second reactor component positioned above or below the first reactor component. The portion of the seal between two reactor components separates the two components and forms a continuous gap between the components such that the components are not in direct contact with one another. The use of seals to separate reactor components can eliminate the need for washers 10 between the components.

Figure 3:
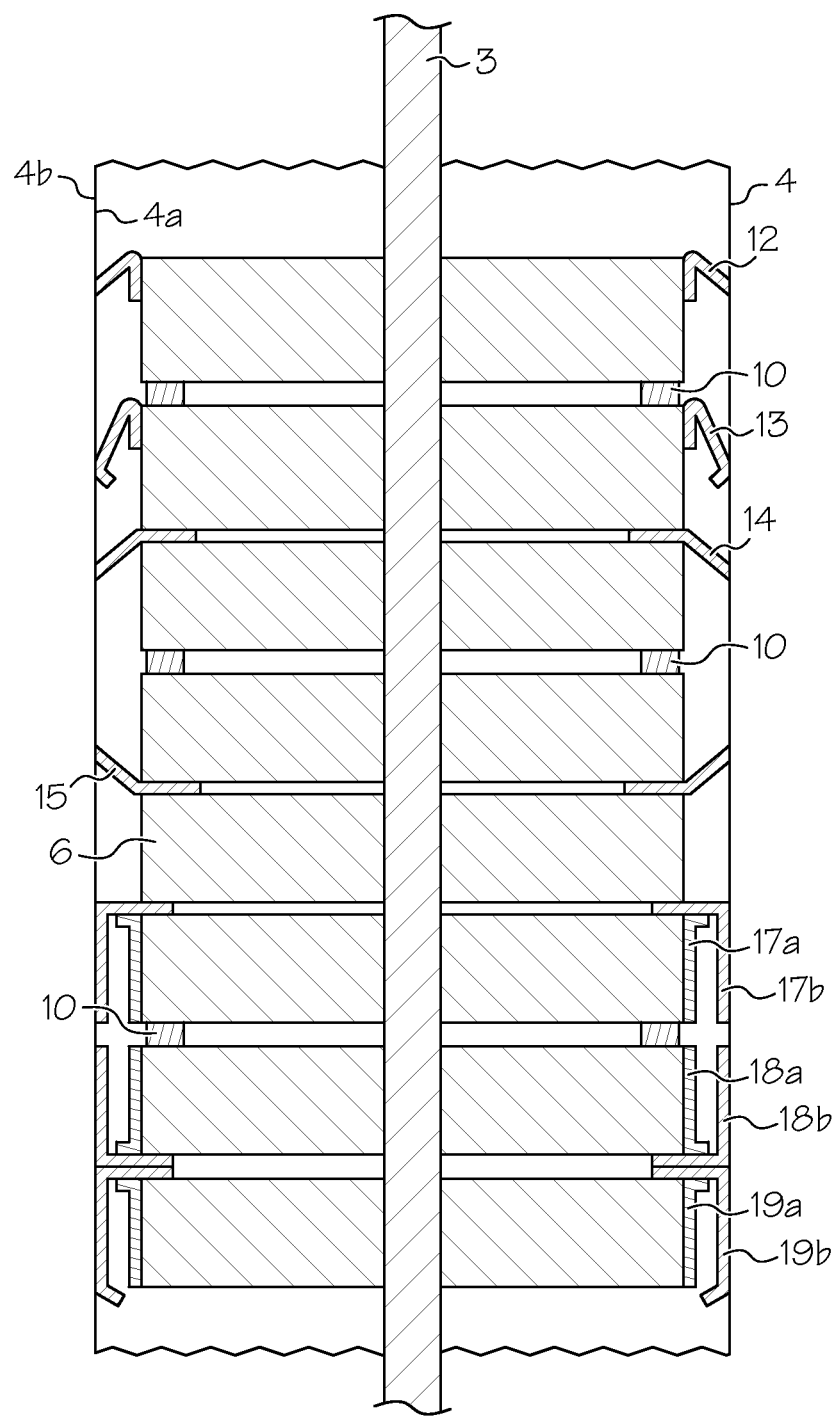
FIG. 3 shows a cross-section view of reactor components stacked in a reactor tube. The reactor components have various embodiments of seals positioned between the reactor components for reducing fluid flow bypass around the perimeter of the components.

Other embodiments of seals are shown in FIG. 3. For example, the seal can be crown shaped seal 12. The seal 12 can have an inner cylindrical portion or ring arranged along and in direct contact with the outer circumferential face of a reactor component 6 as shown. The inner cylindrical portion can extend along the entire length of the outer circumferential face such that the face is covered or optionally only a portion thereof, for instance, at least 10, 30 or 50 percent of the face is covered by the inner cylindrical portion. A crown portion is positioned adjacent the top or bottom of the inner cylindrical portion. The crown portion extends outward from the outer circumferential face of the reactor component towards the inner wall of the reactor tube. Preferably, the outer diameter edge of the crown portion is in contact with the inner wall surface of the reactor tube to form a seal.

The crown portion is bent at an angle, for example, the crown portion extends outward from the circumferential face of the reactor component and forms an angle in the range of 30 to 70 degrees with the outer circumferential face. Preferably, the crown portion of the seals, e.g., seal 12, is angled and points in the direction of the fluid flow through the reactor tube. For example, in FIG. 3, fluid can flow from the bottom to the top of the reactor tube. Seal 12 has a crown portion that is angled upwards towards the interior of the reactor tube or towards the circumferential face of the component in the direction of fluid flow. Fluid flow traveling up through the reactor tube 4 pushes up under the crown portion of the seal 12 and promotes the opening or radial expansion of the crown portion outward to ensure constant contact with the inner wall surface 4a of the reactor tube. In another arrangement, the crown portion extending outward from the circumferential face of the reactor component can form an angle in the range of 100 to 150 degrees with the outer circumferential face.

Another example of a crown seal is shown in FIG. 3 as a modified crown seal 13. The modified crown seal 13 has an additional portion or tip that extends back towards the interior of the reactor at the point where the crown portion contacts the inner wall surface of the reactor tube. The tip terminates in the open gap between the circumferential face and the reactor tube and thus does not contact the reactor component. The tip promotes turbulent fluid flow in the reactor and can enhance heat transfer. The tip portion can form an angle with the reactor tube in the range of 10 to 70 degrees.

The crown seal 12 and modified crown seal 13 can be attached to a reactor component to ensure a fixed arrangement in the reactor and prevent movement or sliding along the circumferential face of the reactor component during operation. For example, the seals can be tack welded to the components or secured to the circumferential face of a component by a band along the outer diameter of the inner cylindrical portion. Alternatively, the seals can be held in place by tension on the seal generated by compressing the seal to fit between the reactor tube and the circumferential face of the reactor component.

Figure 4:
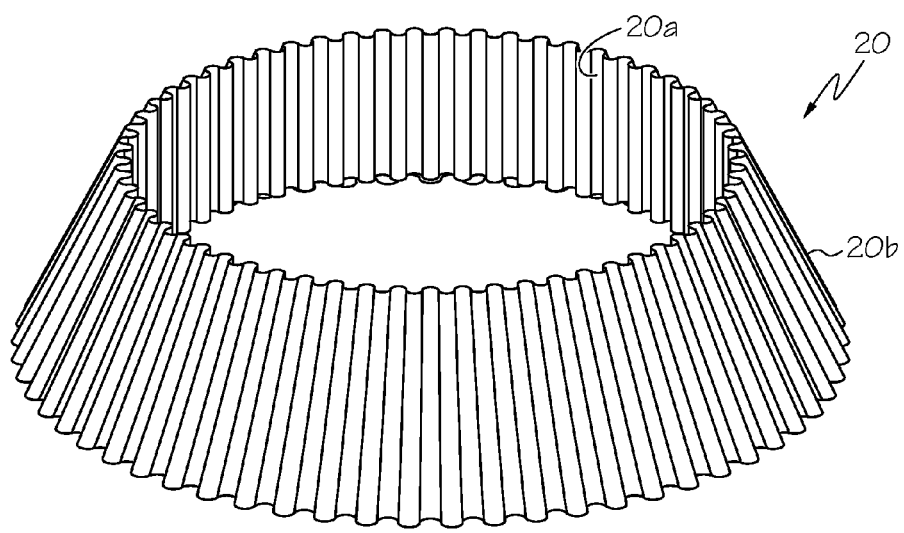
FIG. 4 shows a perspective view of an example of a crown shaped seal configured to fit around the outer circumferential face of a reactor component. The crown seal has a portion extending outward at an angle that can contact the inner wall of the reactor tube.
Figure 5:
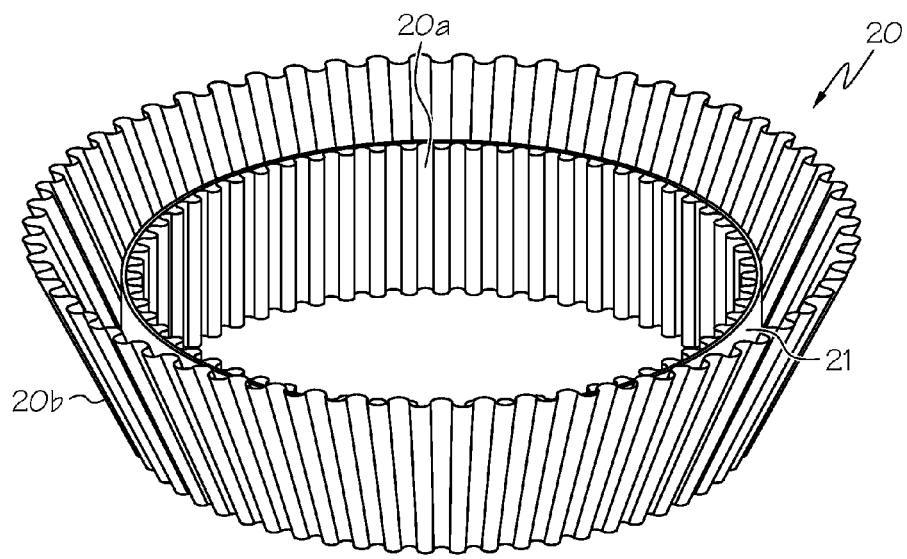
FIG. 5 shows a perspective view of the underside of the crown shaped seal of FIG. 4.

An example of a crown seal is shown in FIGS. 4 and 5. The crown seal 20 is made from a piece of corrugated metal foil. The crown seal 20 has an inner cylindrical portion 20a that forms a ring for aligning the seal along the outer circumferential face of a reactor component. The inner cylindrical portion 20a is preferably positioned so that it is in direct contact with the outer circumferential face of the reactor component. The seal 20 has a bend at its top end that forms a second crown portion 20b that extends outward at an angle from the inner cylindrical portion and, for example, towards the inner wall of a reactor tube. Preferably, the outer diameter edge of the crown portion is in contact with the inner wall surface of a reactor tube during operation.

FIG. 5 shows the crown seal of FIG. 4 facing in the opposite direction. To provide support or secure the crown seal 20 to the outer circumferential face of a reactor component, a band 21 can be positioned around the inner cylindrical portion 20a of the crown seal 20. The band 21 can tighten or reduce the diameter of the inner cylindrical portion 20a to provide a tight fit along the outer circumferential face of a reactor component. The band 21 can be made of any suitable material, such as metal, e.g., metal foil and, in one embodiment, from the same material, in a non-corrugated state, used to make the crown seal 20.

Yet another example of a crown seal is shown in FIG. 3 as seal 14. The seal 14 has a portion that overlaps and is in direct contact with the outer diameter, top surface portion of a reactor component. The seal 9 extends radially outward from the top edge of the reactor component and bends, e.g., at a 45-degree angle, to form a second portion or crown portion. The crown portion is bent at an angle, for example, the crown portion extends outward from the circumferential face of the reactor component and forms an angle in the range of 30 to 70 degrees with the outer circumferential face.

The bend in the seal 14 at the edge of the top or bottom surface of the component allows the seal to flex during operation. For example, reactor components can flex up and down during operation and divert from the horizontal position. The flexible seal 14 can bend or flex with the movement of the components to provide constant contact with the top or bottom surface of the component and inner wall surface of the reactor tube.

In another example, seal 15 is similar to seal 14 except that the crown portion of seal 15 is angled away from the circumferential face of the reactor component and outward towards the inner wall surface of the reactor tube. The outer diameter edge of the crown portion of the seal 15 is in direct contact with the reactor tube and blocks fluid flow through the reactor from passing through the gap between the outer circumferential face and the reactor tube.

Seals 14 and 15 can be used with other types of reactor components, for instance, a reactor basket or cup. Reactor cups can be used to hold sorbent pellets or catalyst beads in the fluid flow path in a reactor to carry out reactions. The reactor cups, similar to the reactor components shown, may be self-supporting or may be mounted on a center support positioned inside the reactor tube. To carry out reactions, fluid must flow through the reactor cup to contact the catalyst coated pellets or beads therein. Fluid flow that bypasses or flows around the reactor cup can reduce the efficiency of the reactor and negatively affect heat transfer from the reactor tube wall to the interior portions of the reactor. A crown seal, for example seals 12, 13, 14 and 15 as shown in FIGS. 3, 4 and 5, can be used on a reactor basket or cup to block fluid flow around the perimeter of the basket or cup and redirect the fluid to flow through the basket or cup to contact the catalyst coated pellets or beads therein.

A reactor cup, for example, can have a top rim or surface that defines the cup opening. The reactor cup also has a wall surface that defines the sides of the cup, such as a cylindrical portion that extends downward through the reactor tube. A crown seal can be utilized with the reactor cup in a variety of ways. In one instance, a crown seal, such as seal 12, can be positioned around the outer wall surface of the cup in the same way as the seal 12 can be attached to a reactor component described above. That is, the inner cylindrical portion or ring of the seal 12 can be arranged along and in direct contact with the wall surface of the reactor cup. The remaining crown portion of the seal 12 extends outward from the cup wall at an angle and contacts the inner wall surface of the reactor tube to form a fluid flow block and thereby forcing the fluid to flow towards the interior of the reactor and through the reactor cup as desired.

In another instance, a crown seal, such as seal 14 or 15, can be arranged to rest on the top rim or surface of a reactor cup. For example, seals 14 and 15 have a flat ring portion with a center opening that can be arranged on the top of a reactor cup without obstructing the cup opening that permits fluid flow to the contact the contents therein. At the outer edge of the flat portion resting on the top of the reactor cup there is a bend that defines the crown portion of the seals 14, 15. The crown portion extends radially outward from the outer perimeter edge of the reactor cup at an angle, either with or against the direction of fluid flow. The outer diameter edge of the crown portion is in direct contact with the inner wall surface of the reactor tube and effectively blocks fluid flow around the outer perimeter of the reactor cup.

In another embodiment, the seals can be two-part seals, for example, three two-part seals are shown in FIG. 3. In a first example, a two-part seal can include two "L" shaped seals having overlapping portions. First seal part 17*a* has an inner cylindrical portion arranged along and in direct contact with the circumferential face of the reactor component. The inner cylindrical portion can cover the entire circumferential face or a portion thereof, for instance, at least 10, 30 or 50 percent of the face. The first seal part 17*a* has a bend, e.g., 90-degree, that forms a second portion that extends radially outward towards the inside wall 4*a* of the reactor tube. As shown, the second portion extends outward radially from the top or bottom surface of the reactor component. The second portion does not contact the reactor tube and terminates in the gap between the circumferential face and inner wall surface of the reactor tube. As described above, the inner cylindrical portion can be attached to the reactor component to prevent movement during operation, or pressure forces it tight against the component.

The second seal part 17 *b* has a portion extending along and in direct contact with the inner wall surface 4*a* of the reactor tube, for instance, at a distance equal to or less than the length of the outer circumferential face of the reactor component. The remaining portion of the second seal part 17*b* is formed by a bend, e.g., 90-degree, and extends radially inward towards the center of the reactor to form a center opening to accommodate fluid flow through the reactor. The remaining portion rests along an outermost portion of the top surface of the reactor component and can separate that component from an adjacent reactor component. The portion of the second seal part 17*b* extending inward towards the center of the reactor overlaps the portion of the first seal part 17*a* extending outward towards the reactor tube. In an example, the overlapping portions of the first and second seal parts 17*a*, 17*b* can be in direct contact with one another.

An alternative arrangement of a two-part seal is shown by the first and second seal parts 18*a* and 18*b*. This two-part seal is identical to seal 17*a*, 17*b* described above except that first and second seal parts 18*a* and 18*b* are arranged such that the overlapping portions are inverted vertically and positioned at or near the bottom surface of the reactor component. For instance, a portion of the second seal part 18*b* extends inward towards the center of the reactor and is in contact with the bottom surface of the reactor component.

In another example of a two-part seal, a two-part seal can include two "L" shaped seals 19*a* and 19*b* having overlapping portions wherein one of the "L" shaped seals 19*b* is a modified seal. A first part 19*a* is arranged in the same manner as seal part 17*a* and the two-part seal 19*a*, 19*b* fits together similar to seal 17*a*, 17*b* described above except that seal has an angled tip portion on the second seal part 19*b*. The second seal part 19*b* extends along and is in direct contact with the inner wall surface 4*a* of the reactor tube, for instance, at a distance equal to or less than the length of the outer circumferential face of the reactor component. The end portion of the second seal part 19*b* has an additional portion or tip that extends back towards the center of the reactor. The tip terminates in or near the gap portion between the circumferential face and the reactor tube and thus does not contact the reactor component. The tip promotes turbulent fluid flow in the reactor and enhanced heat transfer. The tip portion can form an angle with the reactor tube in the range of 10 to 70 degrees.

In another aspect, the angled tip portion of the seal 19*b*, or alternatively the tip portion as also shown on seal 13 of FIG. 3, can facilitate easy installation of the stacked assembly of reactor components and seals. As described above, the tip portion of the seal is angled back towards the interior of the reactor tube and thus the outermost diameter of the seal 19*b* is made up of a rounded bent portion adjacent the inwardly angled tip portion. As the seal 19*b* is lowered into the reactor tube 4 during an installation, the inwardly angled tip portion and rounded outermost diameter edge can prevent the seal being caught up or snagged by irregular inner wall surfaces of the reactor tube. The radially flexibility of the seal can allow the seal to compress inward, or expand outward, to slide over any such wall surface irregularities wherein the inwardly angled tip portion guides the seal along the reactor tube wall.

Figure 6:
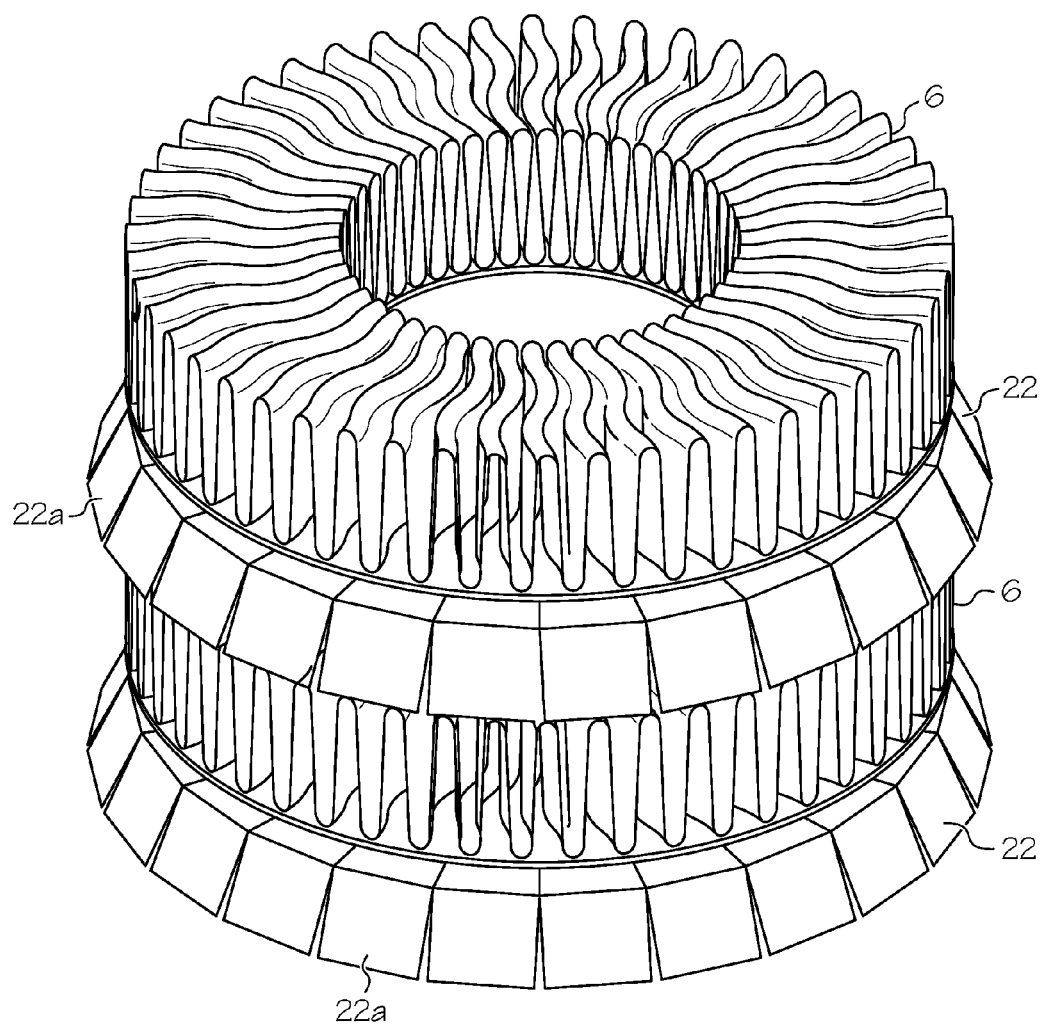
FIG. 6 shows a perspective view of multiple skirt seals positioned between reactor components. The skirt seals have cut portions that radially fan fringe pieces outward for contacting the inner wall surface of a reactor tube.

FIG. 6 shows another example of a seal. A skirt seal 22 is positioned between reactor components 6. The skirt seal 22 has a portion that extends inward towards the center of the reactor component and is in direct contact with the bottom surface of an adjacent component 6. The skirt seal 22 has slits that form individual fringe pieces 22*a*, together the fringed portion that extends outward from the outer diameter bottom or top edge of the reactor components. As shown, the fringe pieces 22*a* are angled outward and during operation can be in contact with the inner wall surface 4*a* of a reactor tube to form a blockage for preventing fluid flow from flowing around the outer circumferential face of the reactor components. The fringed portion can be in the shape of a ring and can be attached to a ring washer or base plate positioned between reactor components, for example, by tack welding the fringe portion.

Although not shown, in another embodiment multiple layers of fringe pieces 22*a*, each layer stacked on top or below one another, can be used to form a blockage having fewer slit openings. The frequency or presence of slit openings can promote fluid flow around the outer circumferential face of the components such that a portion of the fluid bypasses the components and does not transfer heat from the reactor tube to other portions of the reactor. The use of multiple layers of fringed skirt seals, such as two or more layers, can increase the number of fringe pieces 22a that overlap one another or portions thereof to reduce or eliminate the available flow path through the slit openings, which prevents fluid from bypassing the reactor components. The amount of fringe pieces 22a and slit openings can be selected as desired to promote turbulent fluid flow or substantially block fluid flow so that it is redirected and forced to flow away from the reactor tube and back towards the center of the reactor.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modification as encompassed by the scope of the appended claims.

What is claimed is:

1. A reactor comprising: a) a reactor tube having an inner wall surface; b) a reactor component, the reactor component having an outer circumferential face, a top surface and a bottom surface, the reactor component being positioned in the reactor tube such that the outer circumferential face of the reactor component faces the inner wall of the reactor tube and a gap exists between the outer circumferential face of the reactor component and the inner wall of the reactor tube; c) a flexible seal in direct contact with the inner wall surface of the reactor tube and the outer circumferential face, wherein the flexible seal is in contact with the top surface and the bottom surface of the reactor component, a portion of the flexible seal being positioned to block fluid flow through the reactor between the outer circumferential face of the reactor component and the inner wall of the reactor tube.

2. The reactor of claim 1, a portion of the seal being between the outer circumferential face of the reactor component and the inner wall of the reactor tube such that the outer circumferential face and inner wall surface are not in contact with one another.

3. The reactor of claim 1, a portion of the seal being in contact with the outer circumferential face of the reactor component and the remaining portion of the seal extending outward from the outer circumferential face of the reactor component towards the inner wall surface of the reactor tube.

4. The reactor of claim 3, the portion of the seal extending outward from the outer circumferential face of the reactor component being at an angle of 30 to 70 degrees with the outer circumferential face.

5. The reactor of claim 3, the portion of the seal extending outward from the outer circumferential face of the reactor component being at an angle of 100 to 150 degrees with the outer circumferential face.

6. A reactor comprising: a. a reactor tube having an inner wall surface; b. a reactor component, the reactor component having an outer circumferential face, a top surface and a bottom surface, the reactor component being positioned in the reactor tube such that the outer circumferential face of the reactor component faces the inner wall of the reactor tube and a gap exists between the outer circumferential face of the reactor component and the inner wall of the reactor tube; c. a flexible, corrugated seal in direct contact with the inner wall surface of the reactor tube and the outer circumferential face, the top surface or the bottom surface of the reactor component, a portion of the flexible seal being positioned to substantially block fluid flow through the reactor between the outer circumferential face of the reactor component and the inner wall of the reactor tube.

7. The reactor of claim 6, the seal being made of metal foil and expandable in a radial direction.

8. The reactor of claim 6, a portion of the seal being in contact with the top surface or bottom surface of the reactor component and with the top surface or bottom surface of a second reactor component, the seal separating the reactor component and the second reactor component such that the reactor components are not in contact with one another.

9. The reactor of claim 6, a portion of the seal being in a ring shape and in contact with the outer circumferential face of the reactor component.

10. The reactor of claim 9, a separate portion of the seal extending outward at an angle towards the inner wall surface of the reactor tube.

* * * * *